United States Patent Office 2,825,664
Patented Mar. 4, 1958

2,825,664

POLYTETRAFLUOROETHYLENE COATING COMPOSITIONS CONTAINING AN ALKALI METAL SILICATE AND COLLOIDAL SILICA AND ARTICLES COATED THEREWITH

James Robert Huntsberger, Wynnewood, Pa., assignor to E. I. du Pont de Nemours and Company, Wilmington, Del., a corporation of Delaware No Drawing. Application January 21, 1954
Serial No. 405,507

15 Claims. (Cl. 117—232)

This invention relates to aqueous polytetrafluoroethylene coating compositions and more particularly to polytetrafluoroethylene coating compositions having improved adhesion to metals, especially copper.

A customary and convenient form of aqueous polytetrafluoroethylene coating composition is an aqueous dispersion of colloidal polytetrafluoroethylene as disclosed in U. S. Patents 2,478,229 and 2,559,752 to K. L. Berry. The products of these inventions are commonly referred to as aqueous polytetrafluoroethylene suspensoids.

The inertness, insolubility, and lubricity or non-adhesive characteristics of polytetrafluoroethylene coatings are attributes which make these polymers useful for many purposes for which most organic film-forming polymers are inadequate. One serious deficiency of polytetrafluoroethylene coatings is their poor adhesion to metal, i. e. the coalesced film can be rather easily removed from the substrate.

It is a general object of this invention to improve the adhesion of polytetrafluoroethylene coatings to metal substrates, particularly copper and copper-bearing alloys, without adversely affecting other essential properties such as insensitivity to water.

A specific object is to provide aqueous polytetrafluoroethylene coating compositions which yield coatings having improved adhesion to metal substrates, particularly copper or copper-bearing alloys.

A further object is to provide metal articles having polytetrafluoroethylene surface coatings characterized by improved adhesion.

A still further object is to provide copper electrical conductors with polytetrafluoroethylene insulation having high abrasion resistance.

Other objects will become apparent as the description of the invention proceeds.

These objects are accomplished by providing coating compositions comprising an aqueous suspensoid of colloidal polytetrafluoroethylene, water-soluble alkali metal silicate and colloidal silica.

More specifically, these objects are accomplished by providing aqueous coating compositions comprising water, colloidal polytetrafluoroethylene, and 10%–85% by weight based on the polytetrafluoroethylene of water-soluble alkali metal silicate together with colloidal silica, the ratio of said silicate to said silica being between 25:75 and 90:10, by weight.

Further improvements are obtained by adding to the compositions defined immediately above a water-soluble alkali metal alkyl siliconate.

The protective coatings and coated articles of this invention are provided by applying a coating of an above defined coating composition to a suitable substrate and baking the coating at a temperature sufficient to coalesce the polytetrafluoroethylene particles and produce a continuous adherent film, e. g. at about 620° F. or higher.

Aqueous coating compositions containing colloidal polytetrafluoroethylene and water-soluble alkali metal silicate are claimed in the copending application of Jerome Hochberg, Serial No. 399,567, filed December 21, 1953, now Patent No. 2,710,266.

Any aqueous solution of an alkali metal silicate or mixtures thereof may be used in this invention. Such silicate solutions are available commercially in a wide variety of molar ratios of $SiO_2$ to alkali metal oxide, e. g. from about 1:1 to 4:1. Certain water-soluble alkali metal silicates having an $SiO_2$ molar proportion above 4 can be prepared and may be employed in this invention. Examples of suitable water-soluble alkali metal silicates are potassium silicate and sodium silicate.

Aqueous dispersions of colloidal silica are readily available for use in this invention.

Examples of suitable alkali metal alkyl siliconates are Dow Corning XS-1, a water soluble sodium methyl siliconate, and G. E. SC-50, a water solution of sodium methyl siliconate. Such compositions may also be described as alkali metal salts of short chain alkyl substituted siliconic acid.

The following examples of this invention are given by way of illustration but not of limitation. The parts and percentages are by weight.

*Example 1*

A coating composition of this invention was prepared by intimately mixing the following ingredients:

| | Parts by weight |
|---|---|
| Aqueous polytetrafluoroethylene suspensoid | 43.4 |
| Aqueous potassium silicate solution | 28.8 |
| Aqueous colloidal silica | 27.8 |
| | 100.0 |

The polytetrafluoroethylene suspensoid contained 60% colloidal polytetrafluoroethylene, and 1.8% octyl phenyl polyglycol ether, the balance being water containing trace amounts of innocuous materials resulting from the preparation of the suspensoid.

The potassium silicate solution contained 27% potassium silicate having a molar ratio of $SiO_2:K_2O$ of 3.91:1.

The aqueous colloidal silica contained 28% colloidal silica, the balance being water containing a stabilizing amount of sodium hydroxide.

The resulting coating composition contained 31% of polytetrafluoroethylene based on the total water and polytetrafluoroethylene, and 30% of potassium silicate and 30% of colloidal silica based on the polytetrafluoroethylene, the silicate to silica ratio being 50:50.

One coat of this composition was sprayed on a copper panel and baked for 3 minutes at 750° F. Thereafter, three successive coats of a conventional polytetrafluoroethylene top coat composition of the following formula were sprayed on the panel, each being baked for 5 minutes at 750° F.

| | Parts by weight |
|---|---|
| Aqueous polytetrafluoroethylene suspensoid (as previously described in this example) | 78.3 |
| Water | 8.5 |
| Sodium lauryl sulfate dispersing agent | 1.9 |
| Octyl phenyl polyglycol ether dispersing agent | 1.3 |
| Toluene | 10.0 |
| | 100.0 |

The coating was tested for adhesion as follows:

A 1" x 4" section was cut from the panel, and the coating on this section was loosened at one end to permit clamping the free coating and the exposed metal in the jaws of a tension measuring device (Scott Tester, model X-2). As the jaws moved apart, the free film was pulled from the panel at an angle of substantially 180° (i. e. the stripped portion of the film was pulled back over the unstripped portion).

Under these conditions, the instrument recorded a pull of 4.2 pounds which is designated as the adhesion value of the coating to the metal. Under similar conditions of preparation and testing, a polytetrafluoroethylene coating containing no silicate or silica had an adhesion value of less than 0.5 pound. A polytetrafluoroethylene coating containing, in the first coat, 30% potassium silicate based on the polytetrafluoroethylene, but no silica, had an adhesion value of 3.5 pounds. It is seen that the addition of colloidal silica produced a marked increase in adhesion.

In similar tests it was determined that a polytetrafluoroethylene coating containing, in the first coat, 12.5% potassium silicate and 12.5% of colloidal silica based on the polytetrafluoroethylene had an adhesion value of 1.9 pounds in comparison with less than 1 pound when the first coat differed only by not containing colloidal silica. Also, a coating containing 54% potassium silicate and 28% colloidal silica based on the polytetrafluoroethylene had an adhesion value of 4 pounds versus 3 pounds for the same composition containing no colloidal silica.

*Example 2*

A coating composition of this invention was prepared by intimately mixing the following ingredients:

| | Parts by weight |
|---|---|
| Aqueous polytetrafluoroethylene suspensoid | 48.0 |
| Aqueous sodium silicate solution | 28.0 |
| Aqueous colloidal silica | 24.0 |
| | 100.0 |

The polytetrafluoroethylene suspensoid and colloidal silicia were the same as employed in Example 1.

The sodium silicate solution contained 37.6% sodium silicate having a molar ratio of $SiO_2:Na_2O$ of 3.33:1.

The resulting composition contained 35% polytetrafluoroethylene based on the total water and polytetrafluoroethylene, and 36.5% sodium silicate and 23.3% colloidal silica based on the polytetrafluoroethylene, the ratio of silicate to silica being 61:39.

The composition was thinned with 50 parts of water and applied to a copper panel which was baked for 3 minutes at 750° F. Thereafter, five coats of the polytetrafluoroethylene top coat composition of Example 1 were sprayed on the panel, each followed by a 3 minute bake at 750° F.

The resulting coating had an adhesion value of 2.8 pounds versus less than 2 pounds for a similar composition containing no colloidal silica.

*Example 3*

A coating composition of this invention was prepared by intimately mixing the following ingredients:

| | Parts by weight |
|---|---|
| Aqueous polytetrafluoroethylene suspensoid | 49.40 |
| Aqueous potassium silicate solution | 29.60 |
| Aqueous colloidal silica | 19.76 |
| Aqueous sodium methyl siliconate solution | 1.24 |
| | 100.00 |

The first three ingredients were the same as employed in Example 1.

The siliconate solution was G. E. SC-50, supplied by General Electric Company. It contained 31.2% of the siliconate.

The resulting composition contained 34.8% polytetrafluoroethylene based on the total water and polytetrafluoroethylene, 27% potassium silicate and 18.7% colloidal silica based on the polytetrafluoroethylene, and 0.9% sodium methyl siliconate based on the total polytetrafluoroethylene, silicate and silica, the ratio of silicate to silica being 59:41.

When applied to a copper panel, topcoated with a polytetrafluoroethylene top coat composition and tested as described in Example 1, the product of this example had an adhesion value greater than 7 pounds, at which point the film broke as it was being stripped from the panel.

*Example 4*

The product of Example 2 was modified by adding to 100 parts thereof 5 parts of an aqueous 31.2% sodium methyl siliconate solution, amounting to 3.4% of the siliconate based on the total polytetrafluoroethylene, silicate and silica.

When tested as in Example 2, the resulting coating had an adhesion value of 3.9 pounds.

*Example 5*

A coating composition of this invention was prepared by adding and mixing the following ingredients in the order named:

| | Parts by weight |
|---|---|
| Aqueous polytetrafluoroethylene suspensoid | 46.4 |
| Aqueous potassium silicate solution | 20.8 |
| Aqueous colloidal silica | 18.5 |
| Aqueous sodium methyl siliconate solution | 9.2 |
| Aqueous 20% sodium hydroxide solution | 5.1 |
| | 100.0 |

The first four ingredients were the same as employed in Example 3.

The resulting composition contained 34.6% polytetrafluoroethylene based on the total water and polytetrafluoroethylene, 20% potassium silicate and 18.7% colloidal silica based on the polytetrafluoroethylene, and 7.5% sodium methyl siliconate based on the total polytetrafluoroethylene, silicate and silica, the ratio of silicate to silica being 52:48.

This composition was used as a primer or first coat on wire. It was applied by passing a single strand of #25 AWG bare copper wire through a bath of the composition at a rate of 10.6 feet per minute, withdrawing the wire vertically, and baking the coating thereon by passing the wire through a vertical oven four feet long at about 800° F. Then three consecutive coats of a polytetrafluoroethylene wire enamel were applied and baked in the same manner. This polytetrafluoroethylene wire enamel contained 60% colloidal polytetrafluoroethylene and 3% sodium lauryl sulfate dispersing agent, the balance being water containing trace amounts of innocuous materials resulting from the preparation of the colloidal polytetrafluoroethylene.

The resulting coating was about 1.5 mils thick. This insulated wire had a dielectric breakdown voltage of 2600 volts per mil of coating. The insulation resistance was greater than 20,000 megohms. The scrape abrasion as measured with the General Electric Scrape Adhesion Tester was 154 strokes under a 200 gram load.

Wire similarly coated with polytetrafluoroethylene, the first coat of which did not contain silicate, silica or siliconate, had a dielectric strength of 2100 volts per mil and the scrape abrasion was 63 strokes under a 200 gram load.

It is to be understood that the particular ingredients employed in the examples are merely illustrative and that, in particular, the concentration of the essential material in any ingredient may be varied depending upon its source. For instance, a 20% dispersion of colloidal silica can be used in place of a 28% dispersion by making suitable adjustments in the other ingredients to yield a product of this invention having the specified concentration of essential ingredients. Also, for instance, an alkali metal silicate having an $SiO_2$ to alkali metal oxide ratio of 1:1, 2:1 or 3.5:1 can be used instead of those employed in the examples having ratios of 3.9:1 and 3.33:1.

Likewise the wetting or dispersing agents employed in the examples may be replaced partly or wholly by other well known surface-active agents.

Finely divided extender pigments or colored pigments may be incorporated by conventional dispersion methods. Also minor amounts of additives such as film-forming materials, volatile organic liquids, acids and alkalis may be incorporated in the compositions of this invention to further modify the storage, application or film properties.

Colloidal polytetrafluoroethylene may be employed in a wide range of concentrations, preferably 10%–70% by weight based on the total water and polytetrafluoroethylene. Below 10% the compositions yield very thin films, several of which are required to build up a protective coating, the process being unnecessarily costly. Above 70% the compositions are viscous or thixotropic, making uniform application difficult. A particularly preferred range of concentration of colloidal polytetrafluoroethylene is 20%–40% by weight based on the total water and polytetrafluoroethylene, such compositions being easily applied and yielding relatively thick films.

Water-soluble alkali metal silicate together with colloidal silica, both preferably in the form of aqueous solutions or dispersions, may be employed in total concentrations of 10%–85% by weight based on the polytetrafluoroethylene. The preferred range is 15%–40%. The ratio of alkali metal silicate to colloidal silica must be between 25:75 and 90:10, by weight, to produce markedly improved adhesion to metals without adversely affecting other essential properties such as resistance to water. The preferred range of alkali metal silicate to colloidal silica is between 50:50 and 80:20 by weight.

A water-soluble alkali metal alkyl siliconate, preferably in the form of an aqueous solution, may be employed to further enhance adhesion or to reduce the amount of silicate and silica required to yield a given adhesion value, preferably in the amount of 0.5%–20.0% by weight based on the total polytetrafluoroethylene, alkali metal silicate and silica. The particularly preferred range is 1%–10%.

The examples show the most important advantages of the products of this invention, i. e. improved adhesion and electrical properties on copper and copper-bearing alloys. However, the products are not limited to such use, and they may be applied to ferrous metals, aluminum, ceramics, glass, asbestos and other heat resistant substrates in the form of solid rigid articles, porous articles, flexible articles and fabrics. While a single coat in direct contact with the substrate, i. e. as a primer, is the most advantageous method of using the compositions of this invention; obviously they may be used in more than one coat, with or without subsequent top coats of other coating compositions.

The compositions may be applied by any convenient method such as spraying or dipping, followed by baking at a temperature sufficient to coalesce the polytetrafluoroethylene particles into a continuous film. The resulting coatings are useful for protecting the substrate from weather, abrasion or chemical agents, for insulating electrical conductors, or for coating molds, bread pans, cookie sheets or the like with greaseless films to which the material being handled does not stick.

The compositions are most conveniently and economically prepared for warehousing and shipment in relatively concentrated form. Such compositions are easily dilutable to application consistency with water.

It is apparent that many widely different embodiments of this invention can be made without departing from the spirit and scope thereof; and, therefore, it is not intended to be limited except as indicated in the appended claims.

I claim:

1. An aqueous coating composition comprising water, colloidal polytetrafluoroethylene, and 10%–85% by weight based on the polytetrafluoroethylene of water-soluble alkali metal silicate together with colloidal silica, the ratio of said silicate to said silica being between 25:75 and 90:10 by weight.

2. A coating composition of claim 1 comprising 15%–40% by weight based on the polytetrafluoroethylene of water-soluble alkali metal silicate together with colloidal silica.

3. A coating composition of claim 1 in which the ratio of said silicate to said silica is between 50:50 and 80:20.

4. A coating composition of claim 1 in which said silicate is potassium silicate.

5. A coating composition of claim 1 in which said silicate is sodium silicate.

6. A coating composition of claim 1 in which the colloidal polytetrafluoroethylene is present in the amount of 10%–70% by weight of the total water and polytetrafluoroethylene.

7. A coating composition of claim 1 in which the colloidal polytetrafluoroethylene is present in the amount of 20%–40% by weight of the total water and polytetrafluoroethylene.

8. A coating composition of claim 1 also comprising sodium methyl siliconate.

9. A coating composition of claim 1 comprising 0.5%–20% alkali metal alkyl siliconate, by weight based on the total polytetrafluoroethylene, silicate and silica.

10. A coating composition of claim 1 comprising 1%–10% alkali metal alkyl siliconate, by weight based on the total polytetrafluoroethylene, silicate and silica.

11. An article having an adherent baked coating of a composition of claim 1.

12. An electrical conductor having a baked insulating coating of a composition of claim 1.

13. A coating composition of claim 1 also comprising alkali metal alkyl siliconate.

14. An article having an adherent baked coating of a composition of claim 13.

15. An electrical conductor having a baked insulating coating of a composition of claim 13.

References Cited in the file of this patent

UNITED STATES PATENTS

| | | |
|---|---|---|
| 2,386,674 | Flint et al. | Oct. 9, 1945 |
| 2,592,147 | Ikeda | Apr. 8, 1952 |
| 2,710,266 | Hochberg | June 7, 1955 |